(12) United States Patent
Barra

(10) Patent No.: US 7,134,239 B2
(45) Date of Patent: Nov. 14, 2006

(54) METHOD FOR THERMAL PEST CONTROL

(76) Inventor: Florencio Lazo Barra, P.O. Box 780, Rancagua (CL)

( * ) Notice: Subject to any disclaimer, the term of this patent is extended or adjusted under 35 U.S.C. 154(b) by 0 days.

(21) Appl. No.: 10/132,693

(22) Filed: Apr. 26, 2002

(65) Prior Publication Data

US 2003/0200696 A1  Oct. 30, 2003

(51) Int. Cl.
*A01M 1/20* (2006.01)
*A01M 19/00* (2006.01)
(52) U.S. Cl. .................. 43/144; 43/141; 43/132.1; 47/1.44
(58) Field of Classification Search .............. 43/130, 43/141, 132.1, 124, 144; 47/1.42, 1.43, 1.44, 47/2; 239/130; 422/26; 42/1, 44
See application file for complete search history.

(56) References Cited

U.S. PATENT DOCUMENTS

| | | | | |
|---|---|---|---|---|
| 194,861 A | * | 9/1877 | Church | 43/124 |
| 1,021,530 A | * | 3/1912 | Johnson | 47/58.1 R |
| 1,090,280 A | * | 3/1914 | Coldiron | 43/124 |
| 1,131,458 A | * | 3/1915 | Barefield | 43/132.1 |
| 1,180,434 A | * | 4/1916 | Robinson | 43/141 |
| 1,250,516 A | * | 12/1917 | Salter | 43/141 |
| 1,257,343 A | * | 2/1918 | Harper | 43/141 |
| 1,284,698 A | * | 11/1918 | Johnson | 43/141 |
| 1,306,209 A | * | 6/1919 | Williams | 47/1.41 |
| 1,402,960 A | * | 1/1922 | Rannefeld | 43/141 |
| 1,467,495 A | * | 9/1923 | Patton | 43/141 |
| 1,482,785 A | * | 2/1924 | Coolidge | 43/141 |
| 1,488,140 A | * | 3/1924 | Abercrombie | 43/141 |
| 1,498,793 A | * | 6/1924 | Harris | 43/141 |
| 1,567,969 A | * | 12/1925 | August | 43/132.1 |
| 1,580,297 A | * | 4/1926 | Hammock | 43/144 |
| 1,591,083 A | * | 7/1926 | Erdos | 43/130 |
| 1,602,849 A | * | 10/1926 | Harris | 43/141 |
| 1,754,083 A | * | 4/1930 | Collins et al. | 43/144 |
| 1,876,737 A | * | 9/1932 | Opp | 43/124 |
| 1,936,557 A | * | 11/1933 | Manion | 239/380 |
| 2,051,057 A | * | 8/1936 | Pettit | 43/124 |
| 2,059,835 A | * | 11/1936 | Worthing et al. | 43/132.1 |
| 2,114,494 A | * | 4/1938 | Hummel et al. | 43/132.1 |
| 2,272,190 A | * | 2/1942 | Elliott | 111/121 |
| 2,346,270 A | * | 4/1944 | Nisbet | 43/141 |
| 2,467,393 A | * | 4/1949 | Leher | 43/132.1 |
| 2,602,267 A | * | 7/1952 | Neundorfer | 47/2 |
| 2,602,388 A | * | 7/1952 | Elliott et al. | 47/1.42 |
| 2,615,284 A | * | 10/1952 | Fowler, Jr. | 47/2 |
| 2,722,082 A | * | 11/1955 | Nisbet et al. | 43/141 |
| 3,120,949 A | * | 2/1964 | Robinson | 47/2 |
| 3,443,885 A | * | 5/1969 | Scholtus | 43/130 |
| 3,477,174 A | * | 11/1969 | Lalor | 47/1.44 |
| 3,626,636 A | * | 12/1971 | Wheeler | 47/1.44 |
| 3,636,939 A | * | 1/1972 | Sijbring | 126/271.2 R |
| 4,513,529 A | * | 4/1985 | Reich | 47/2 |
| 4,620,388 A | * | 11/1986 | Imagawa | 43/130 |
| 4,716,676 A | * | 1/1988 | Imagawa | 43/130 |
| 4,817,329 A | * | 4/1989 | Forbes | 43/132.1 |
| 4,911,889 A | * | 3/1990 | Leland et al. | 47/1.42 |
| 4,953,320 A | * | 9/1990 | Nelson | 43/132.1 |
| H828 H | * | 10/1990 | Armstrong et al. | 426/615 |
| 4,961,283 A | * | 10/1990 | Forbes | 43/132.1 |
| 5,002,227 A | * | 3/1991 | Ehrenberg | 47/1.7 |
| 5,020,510 A | * | 6/1991 | Jones | 47/1.44 |
| 5,030,086 A | * | 7/1991 | Jones | 47/1.44 |
| 5,058,313 A | * | 10/1991 | Tallon | 43/132.1 |
| 5,099,598 A | * | 3/1992 | Carter | 43/132.1 |
| 5,189,832 A | * | 3/1993 | Hoek et al. | 47/1.44 |
| 5,433,758 A | * | 7/1995 | Thompson et al. | 47/58.1 R |
| 5,471,782 A | * | 12/1995 | Brittell | 43/132.1 |
| 5,575,111 A | * | 11/1996 | Rajamannan | 47/58.1 R |
| 5,622,123 A | * | 4/1997 | Rajamannan | 111/120 |
| 5,682,707 A | * | 11/1997 | Chastain | 47/1.44 |
| 5,768,822 A | * | 6/1998 | Harrell | 43/144 |
| 5,848,492 A | * | 12/1998 | Brown | 47/1.44 |
| 5,867,935 A | * | 2/1999 | Brown | 47/1.01 R |
| 5,927,601 A | * | 7/1999 | Newson et al. | 239/1 |
| 5,934,013 A | * | 8/1999 | Barra | 47/2 |
| 5,946,851 A | * | 9/1999 | Adey et al. | 47/1.5 |
| 5,974,728 A | * | 11/1999 | Nichols | 43/140 |
| 6,073,859 A | * | 6/2000 | Gorgens | 239/13 |
| 6,141,901 A | * | 11/2000 | Johnson et al. | 43/124 |
| 6,146,600 A | * | 11/2000 | Williamson | 43/124 |
| 6,279,261 B1 | | 8/2001 | Binker et al. | |

(Continued)

FOREIGN PATENT DOCUMENTS

DE  2828743 A  *  1/1980

(Continued)

OTHER PUBLICATIONS

Adam Kavalier, "The Effects of Methyl Jasmonate on the anthocyanin content and growth rates of the Wisconsin fast plants *Brassica rapa* ", 7 pages, description of research performed at the College of Charleston, Charleston, South Carolina, n.d.

(Continued)

*Primary Examiner*—Darren W. Ark
(74) *Attorney, Agent, or Firm*—Crowell & Moring LLP

(57) ABSTRACT

A method for thermal pest control in fruit production and agriculture involves projecting at least one stream of hot air to a crop from a movable vehicle which moves in a direction substantially parallel to rows of the crop. The stream of hot air can be projected substantially parallel to, substantially transverse to, or substantially oblique to the rows of the crop.

2 Claims, No Drawings

U.S. PATENT DOCUMENTS

| | | | |
|---|---|---|---|
| 6,447,737 B1 * | 9/2002 | Williamson et al. | 43/124 |
| 6,505,437 B1 * | 1/2003 | Johnstone et al. | 47/1.44 |
| 6,612,067 B1 * | 9/2003 | Topp | 43/124 |
| 6,655,082 B1 * | 12/2003 | Paltin et al. | 47/1.42 |
| 2002/0170227 A1 * | 11/2002 | Topp | 43/124 |
| 2002/0194773 A1 * | 12/2002 | Topp | 43/124 |
| 2003/0026727 A1 * | 2/2003 | Topp | 43/124 |
| 2003/0200696 A1 * | 10/2003 | Barra | 43/141 |
| 2004/0035044 A1 * | 2/2004 | Topp | 43/124 |
| 2005/0108920 A1 * | 5/2005 | Takenoshita et al. | 43/132.1 |

FOREIGN PATENT DOCUMENTS

| | | | |
|---|---|---|---|
| DE | 2828743 A1 * | 1/1980 | |
| DE | 3237793 A1 * | 10/1982 | |
| DE | 4025828 A * | 2/1992 | |
| DE | 4100221 A1 * | 7/1992 | |
| DE | 19642624 A1 * | 4/1998 | |
| EP | 143324 A2 * | 6/1985 | |
| EP | 1356730 A2 * | 10/2003 | |
| JP | 56053603 A * | 5/1981 | |
| JP | 02286027 A * | 11/1990 | |
| JP | 6-335344 A * | 12/1994 | |
| JP | 2003-199477 A * | 7/2003 | |
| WO | WO-95/16341 A1 * | 6/1995 | |

OTHER PUBLICATIONS

Annex (2 pages), n.d.

* cited by examiner

METHOD FOR THERMAL PEST CONTROL

The entire disclosure of my prior U.S. Pat. No. 5,934,013, issued Aug. 10, 1999, is incorporated herein by reference.

FIELD OF THE INVENTION

This invention relates to thermal pest control in fruit production and agriculture. More specifically, the present invention is applicable to open spaces dedicated to agriculture, such as vineyards and fruit orchards, fruit production, and crops, to preferably eliminate undesirable fungus. The method is also suitable for eliminating insects by dehydrating them and, in the case of insects with wings, damaging the wings.

BACKGROUND OF THE INVENTION

Chemical pest control in agriculture and in fruit culture has been used very successfully to control pests during the past seventy years. Every year, more chemicals are developed, apparently with new advantages over their predecessors relating to cost, ease of application, and the varieties of pests controlled. Unfortunately, also for a long time, and currently, it has been discovered that many of these chemicals have undesirable secondary effects on the environment or on other plants and animals, including man. Some of these undesirable effects, due to a cumulative effect on the body or to genetic transmission affecting new generations, have been seen only after many years of continuous use of the chemical; other undesirable effects are seen very fast. For these reasons, there is a tendency to look for solutions with very little or no impact at all on the environment.

One of the first non-chemical solutions was a biological pest control provided by stimulating development of natural predators of pests. A problem with this is that sometimes a predator will eliminate not only a pest but also some of the natural controls, and then a serious ecological problem may result.

Other pest control alternatives to biological and chemical methods involve the modification of some physical variables of the pest habitat; in this way the pest is put in an environment which is unfriendly to its development and reproduction. These kinds of solutions include, among others, refrigeration, humidity reduction, heat application, and oxygen reduction. A problem with this kind of solution is determining the habitat variables to be modified and the magnitude and time of habitat variable modification in order to get desired effects on the pest without harming the species to be protected.

In these kinds of solutions, heat application has been shown to be very useful. One of the first solutions for eliminating microorganisms was the well-known method of pasteurization. This method is only applicable to inanimate substances of animal or plant origin, and cannot be used on live animals or plants. Other methods for pest control using heat have been proposed; such methods are disclosed in U.S. Pat. No. 4,817,329 to Forbes and U.S. Pat. No. 6,279,261 to Binker et al.

Forbes teaches a method to kill insects, such as termites, in an urban structure, such as an insulated space, in which a heated gas, with no phase changes, is insufflated. The gas is at a temperature above the ambient temperature which is lethal for the insect, and the temperature is maintained for a sufficient period of time to kill the insect. In the Forbes method, entrance ducts and exit ducts for the heated gases are installed. Forbes also teaches that the space to be treated has to be insulated with mats in windows and doors in order to facilitate accumulation of heated gases. As a result, the Forbes method cannot be used in open spaces and, therefore, cannot be used in agriculture or fruit production.

Binker et al. also teach a method to kill pests in closed spaces, like mills or food processing plants. The Binker et al. procedure does not require insulating spaces, but this is because the space in which the Binker et al. method is used is normally closed and without windows, like in the urban structures of Forbes. The Binker et al. method is not applicable in open fields like those used in agriculture or fruit production. The most important concerns of Binker et al. are to not contaminate or alter foods in a processing plant, to avoid the introduction of combustion gases, and to control the humidity of the heated air.

Neither Forbes nor Binker et al. teaches a pest control method using heated gases or heated air in an open space in which it is necessary to maintain or preserve, without any harm, living vegetable species like vines, fruit trees, or plants.

BRIEF DESCRIPTION OF THE INVENTION

The present invention provides a method for thermal pest control in fruit production and agriculture, and is useable in open spaces, like vineyards, fruit orchards, and so on. The method of the present invention preferably allows eliminating a fungus that affects the plants, and also allows eliminating harmful insects by dehydrating them and, in the case of winged insects, damaging the wings. The method is especially effective in eliminating harmful insects, like *Drosophila melanogaster* larvae, when they are in a vulnerable stage. A clear difference between rows treated with the thermal method of the present invention in a vineyard and rows treated with chemicals to protect the vines against the fungus *Botritis cirenea* has also been observed. In rows treated with chemicals, sporadic attacks of a mite called *Brevipalpus chilensis* can be observed, while rows treated according to the present method are completely free of this pest.

The method of the invention is very simple, and the invention has economical and environmental advantages which are better than advantages of the prior art. The concept on which the invention is based breaks a paradigm and applies, for the first time, heated air directly or indirectly to the plants to eliminate pests. The procedure basically consists of projecting, from a moving vehicle, one or more streams of heated air, at temperatures between 65° C. to 250° C., over the plants at a minimum distance of about 0.20 m from the exits of hot air.

The present invention has been successfully used to control the Oidium (*Uncinula necator*) and Botritis (*Botritis cinerea*) fungi in table grape vineyards. Up to this time, these two fungus diseases have been controlled only with the use of chemical fungicides, with the consequent harm to the environment and to the consumers.

Secondarily, the present invention allows elimination of condensation over the fruits or plants, preventing the development of undesirable fungus and allowing producers to pack their fruits without problems related to condensation.

Therefore, a primary objective of the invention is to offer a method for pest control in fruit production and agriculture in which streams of hot air are thrown at the plants from a movable vehicle.

Another objective of the present invention is offering a method for fungus control in fruit production and in agriculture, especially in but not limited to vineyards and fruit orchards, including the application of streams of hot air to the plants from a movable vehicle.

Another objective of the present invention is offering a method which, beyond pest control in agriculture and fruit production, can reduce or eliminate condensation over the fruits or plants.

DETAILED DESCRIPTION OF THE INVENTION

The present invention concerns a method for thermal control of pests, in fruit production and agriculture, in open spaces. The method of the invention is preferably applied in vineyards in order to control fungus diseases like Oidio (*Uncinula necator*), y Botritis (*Botritis cinerea*), which attacks grape bunches, or, in apple orchards, to control Venturia (*Venturia inaequalis*). These fungi die at temperatures between 40° C. to 60° C.; insects are affected at greater temperatures, depending on the species and their stages of development.

According to the method, at least one stream of hot air is projected, at a temperature between approximately 65° C. to 250° C. and at a minimum distance of about 0.20 m from the plants, from a movable vehicle, moving at a speed between approximately 5 to 15 km per hour and in a direction substantially parallel to rows of the plants. The streams of hot air are thrown at a speed between approximately 80 to 250 km per hour, and preferably at a speed of approximately 100 km per hour. Since the stream of hot air is at a high temperature, for example 250° C., and has a speed as mentioned, transference of heat to the treated vegetation is sufficiently high to damage the pest but is sufficiently brief so as to not damage the plants. In reality, the hot air applied to the plants as mentioned before stays at a temperature above 45° C. for a period of 16 seconds.

In preliminary trials in vineyards with fungus diseases, when applying hot air at 110° C., fungus was controlled and, also, some insects, like the *Drosophila melanogaster* fly, were eliminated. Also severely damaged were *Micrapate scabrata*, *Capitarsia turbata* and *Proeulia auraria*.

The appropriate temperature to be used in this method will depend in each case, on the type of crop, the pest, and the ambient temperature.

For application of the streams of hot air over a treated field from a movable vehicle, the streams can be oriented parallel to, perpendicular to, or oblique to rows of plants, depending on the heat sensitivity of the plant, the row thickness, or the tree foliage.

It is necessary to clarify that, in spite of the very high speed and temperature of the stream of hot air, the stream expands very rapidly as it exits and, as the source of hot air is moving, the time during which the plant is affected by the hot air is very short.

I claim:

1. A method for thermal pest control in agriculture and fruit production which comprises projecting at least one stream of hot air which exits at a temperature between approximately 65° C. and 250° C. directly at a crop and at a minimum distance of about 0.20 m from the crop from a vehicle which moves in a direction substantially parallel to rows of the crop so as to provide sufficient transference of heat to produce the thermal pest control without damaging the crop, wherein said at least one stream of hot air is projected at a speed between approximately 80 and 250 km per hour.

2. The method for thermal pest control according to claim 1, wherein the pest to be controlled is any of the fungi *Uncinula necator*, *Botritis cinerea* and *Venturia inaequalis* or any of the insect varieties *Drosophila melanogaster*, *Micrapate scabrata*, *Capitarsisa turbata* and *Proeulia auraria*.

* * * * *